US007253612B2

(12) United States Patent
Schroter et al.

(10) Patent No.: US 7,253,612 B2
(45) Date of Patent: Aug. 7, 2007

(54) SCALE AND METHOD FOR PRODUCING THIS SCALE AND POSITION MEASURING SYSTEM EMPLOYING SUCH A SCALE

(75) Inventors: Andreas Schroter, Traunstein (DE); Michael Schwabe, Bad Endorf—Hemhof (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 51 days.

(21) Appl. No.: 10/622,024

(22) Filed: Jul. 17, 2003

(65) Prior Publication Data

US 2004/0066187 A1 Apr. 8, 2004

(30) Foreign Application Priority Data

Jul. 18, 2002 (DE) ................ 102 32 559

(51) Int. Cl.
*G01B 7/30* (2006.01)
(52) U.S. Cl. ............... 324/207.22; 324/207.25
(58) Field of Classification Search .......... 324/207.22, 324/207.23, 207.24, 207.25, 252, 174, 163, 324/166, 151 R; 338/32 H, 32 R
See application file for complete search history.

(56) References Cited

U.S. PATENT DOCUMENTS 4,274,053 A * 6/1981 Ito et al. ................ 324/174

5,734,266 A * 3/1998 Spies ................ 324/207.22
6,717,401 B2 * 4/2004 Schwabe ............ 324/207.22

FOREIGN PATENT DOCUMENTS

EP 0 715 151 B1 4/1997
JP 06103552 A * 4/1994

OTHER PUBLICATIONS

Page 720 of The American Heritage College Dictionary, 4th Edition.*

* cited by examiner

*Primary Examiner*—Edward Lefkowitz
*Assistant Examiner*—David M. Schindler
(74) *Attorney, Agent, or Firm*—Brinks Hofer Gilson & Lione

(57) ABSTRACT

A scale that includes a first base body having a first non-magnetizable support and a first set of magnetic elements that are arranged laterally next to the first non-magnetizable support, are magnetized in a single identical direction and are arranged in a measuring direction. A second base body having a second non-magnetizable support and a second set of magnetic elements that are arranged laterally next to the second non-magnetizable support, are magnetized in the single identical direction and area arranged in the measuring direction. The first base body and the second base body are put together such that in the measuring direction alternating ones of the first and second sets of magnetic elements are arranged and the first and second sets of magnetic elements have different magnetic orientations with respect to each other.

38 Claims, 3 Drawing Sheets

SCALE AND METHOD FOR PRODUCING THIS SCALE AND POSITION MEASURING SYSTEM EMPLOYING SUCH A SCALE

Applicants claim, under 35 U.S.C. §119, the benefit of priority of the filing date of Jul. 18, 2002 of a German patent application, copy attached, Ser. No. 102 32 559.6, filed on the aforementioned date, the entire contents of which is incorporated herein by reference.

BACKGROUND OF THE INVENTION

1. Field of the Invention

The present invention relates to a scale, having magnetic elements of different magnetization, which are arranged in the measuring direction, and wherein the scale is put together from several base bodies, each base body having several of the magnetic elements on a non-magnetizable support, and wherein the magnetic elements of a base body are magnetized in a single identical direction, and the combined scale has alternatingly a magnetic element of one base body and a magnetic element of another base body in the measuring direction. The present invention furthermore relates to a method for producing such a scale. Finally, the present invention also relates to a position measuring system employing such a scale.

2. Discussion of Related Art

Scales of this type are employed in position measuring systems of processing machines for measuring the relative position of a tool with respect to a workpiece to be processed, as well as in coordinate-measuring machines for detecting the position and dimensions of test objects. In the course of this, the position measuring system can be employed as a direct measuring system, i.e. installed directly on the components to be measured, or as an indirect measuring system, i.e. installed on the drive mechanisms (electrical drive motors). Further applications are found in connection with motor vehicles, for example as steering angle sensors, and in office communications.

A scale is known from EP 0 715 151 B1, which is formed by assembling two identical base bodies. Each one of these base bodies has several magnetic elements magnetized in the same direction. When assembled, the magnetic elements of the one base body lie in the spaces between the magnetic elements of the other base body, so that the scale alternatingly has a magnetic element of one body and of a further body in the measuring direction. In the assembled state, the magnetic elements of the one base body are magnetized in the opposite direction from the magnetic elements of the other base body.

For achieving a zero-symmetrical magnetic field at the surface to be scanned for a position measurement, it is proposed to injection-mold the magnetic elements onto a disk-shaped non-magnetic support by a dual-component injection-molding process.

However, this has the disadvantage that the non-magnetic support is arranged on a surface of the scale which is to be scanned, which results in a reduced magnetic field strength at the scanning location.

OBJECT AND SUMMARY OF THE INVENTION

It is therefore an object of the present invention to create a scale which is simple to manufacture and which generates the greatest possible magnetic field strength at the scanning location for a position measurement.

In accordance with the present invention, this object is attained by a scale that includes a first base body having a first non-magnetizable support and a first set of magnetic elements that are arranged laterally next to the first non-magnetizable support, are magnetized in a single identical direction and are arranged in a measuring direction. A second base body having a second non-magnetizable support and a second set of magnetic elements that are arranged laterally next to the second non-magnetizable support, are magnetized in the single identical direction and area arranged in the measuring direction. The first base body and the second base body are put together such that in the measuring direction alternating ones of the first and second sets of magnetic elements are arranged and the first and second sets of magnetic elements have different magnetic orientations with respect to each other.

It is a further object of the present invention to disclose a method for producing such scales.

In accordance with the present invention, this object is attained by a method for producing a scale that includes providing a first base body having a first non-magnetizable support and a first set of magnetic elements that are arranged laterally next to the first non-magnetizable support, are magnetized in a single identical direction and are arranged in a measuring direction. Providing a second base body having a second non-magnetizable support and a second set of magnetic elements that are arranged laterally next to the second non-magnetizable support, are magnetized in the single identical direction and area arranged in the measuring direction. Combining the first base body with the second base body is accomplished by sticking them together such that in the measuring direction alternating ones of the first and second sets of magnetic elements are arranged and the first and second sets of magnetic elements have different magnetic orientations with respect to each other.

Moreover, a position measuring system is to be disclosed by the present invention, which is simply constructed and permits a dependable position measurement.

This object is attained by a position measuring system having a scale having a first base body including a first non-magnetizable support and a first set of magnetic elements that are arranged laterally next to the first non-magnetizable support, are magnetized in a single identical direction and are arranged in a measuring direction. A second base body including a second non-magnetizable support and a second set of magnetic elements that are arranged laterally next to the second non-magnetizable support, are magnetized in the single identical direction and area arranged in the measuring direction. The first base body and the second base body are put together such that in the measuring direction alternating ones of the first and second sets of magnetic elements are arranged and the first and second sets of magnetic elements have different magnetic orientations with respect to each other. A scanning element, which is sensitive to a magnetic field, for scanning the first and second sets of magnetic elements.

Exemplary embodiments of the present invention will be explained by the drawings.

DETAILED DESCRIPTION OF THE PREFERRED EMBODIMENTS

Figure 1:
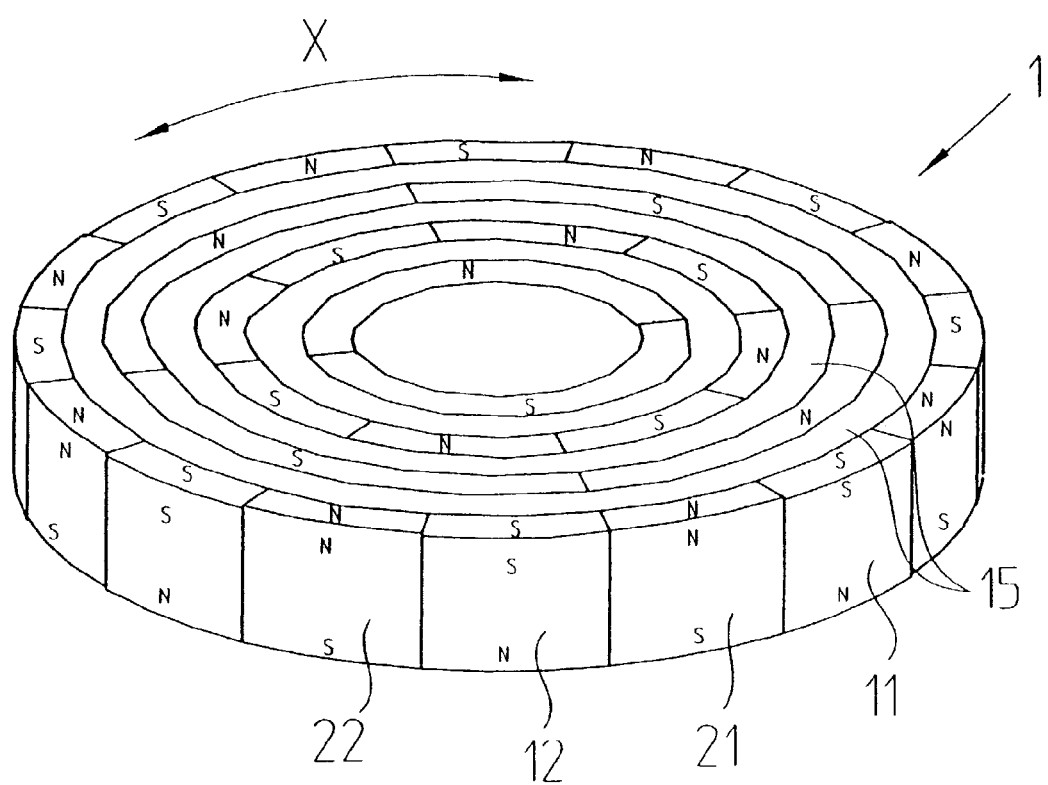
FIG. 1 is a perspective plan view of an embodiment of a scale in accordance with the present invention.

A scale embodied in accordance with the present invention will be explained by FIGS. 1 and 2 by the example of a coded disk 1 for an angle measuring device.

The coded disk 1 includes concentrically arranged code tracks, which are radially spaced apart from each other. Each code track has a sequence of magnetic elements 11, 21, 12, 22, which are arranged one behind the other in the measuring direction X (circumferential direction). The direction of magnetization of successive magnetic elements 11, 21, 12, 22 is differently oriented, in particular oppositely directed. Preferably the code tracks form a Gray code. For controlling an electric motor, the code tracks can also form commutation tracks, known per se.

The code tracks with the magnetic elements 11, 21, 12, 22 are spaced apart from each other in the radial direction, and concentric strips 15, 25 of a non-magnetic material extend in this interspace.

Figure 2:
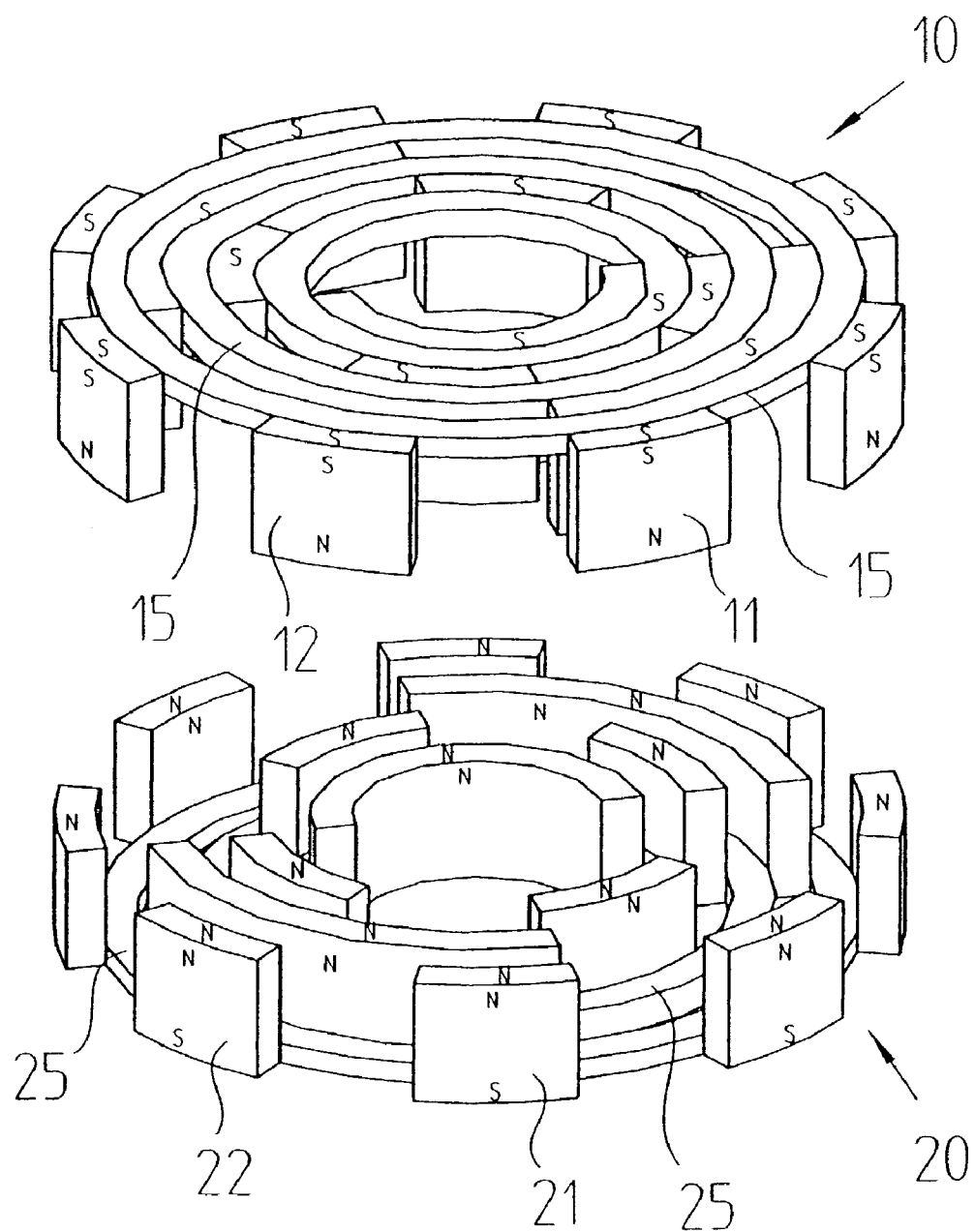
FIG. 2 is a perspective plan view of embodiments of two axially magnetized base bodies in the course of being assembled to form the scale of FIG. 1 in accordance with the present invention.

The coded disk 1 is put together from several base bodies 10, 20 as shown in FIG. 2. The magnetic elements 11, 12, 21, 22 of a base body 10, 20 are arranged laterally (viewed transversely to the measuring direction X) next to a non-magnetic strip-shaped support 15, 25. The thickness and axial position of the supports 15, 25 next to the magnetic elements 11, 12, 21, 22 has been selected to be such that, following the assembly process represented in FIG. 2, the magnetic elements 11, 12 of the one base body 10 and the magnetic elements 21, 22 of the other base body 20 come to rest on a least one front surface at the same height, and therefore on a common plane, and do not interfere with each other during the assembly process.

The magnetic elements 11, 12, 21, 22 of a respective base body 10, 20 are axially magnetized in the same direction, which occurs in a single process step. The magnetization direction can also extend radially or in the measuring direction X. It is particularly advantageous if the two base bodies 10, 20 represented in FIG. 2 are identical, i.e. have the same geometric shape and the same magnetization. The coded disk with magnetic elements 11, 21, 12, 22 of different magnetization arranged in the measuring direction X, wherein one magnetic element 11, 12 of the one base body 10 enters between respectively two magnetic elements 21, 22 of the other base body 20, which follow each other in the measuring direction X, is only created by the assembly of the two base bodies 10, 20 in opposing directions, in that one of the base bodies is rotated by 180°. Therefore, in the measuring direction X the assembled coded disk 1 has magnet elements 11, 12 of a base body 10 alternating with magnetic elements 21, 22 of the other base body 20.

An advantage that the magnetic elements 11, 12, 21, 22 of a base body 10, 20 are each located next to a non-magnetic support 15, 25 can be seen to be that these supports 15, 25 cannot disadvantageously affect the magnetic fields of the magnetic elements 11, 12, 21, 22, but that yet satisfactory stability, and therefore a manipulation capability of the base bodies 10, 20 is assured. As can be seen in FIG. 1, the axial ends of the magnetic elements 11, 21, 12, 22 of the two base bodies 10, 20, i.e. the alternatingly arranged north and south poles, are arranged in one plane and can therefore be scanned at a relatively short scanning distance by a scanning element 2 (Hall element or magneto-resistive resistance strip). No interfering support is located in the space between the magnetic elements 11, 12, 21, 22 and the scanning element 2. The support(s) 15, 25 is/are not arranged on the surface of the magnetic elements 11, 12, 21, 22 to be scanned, but exclusively laterally next to the surface of the magnetic elements 1, 12, 21, 22 to be scanned for a position measurement.

A base body 10, 20 is particularly advantageously produced by a dual-component injection-molding process by injecting two materials on top of each other, wherein the material constituting the support 15, 25 is not magnetizable. The material which constitutes the magnetic elements 11, 12, 21, 22 is a plastic material filled with magnetic or magnetizable substances. Hard-magnetic materials in the form of neodymium-iron-boron (NdFeB), samarium-cobalt (SmCo) or ceramic magnets are preferably selected as the magnetizable substance, by which a high magnetic field strength can be realized. In this case an isotropic or an anisotropic production is possible. Polyamide (PA), for example, which can be fiberglass-reinforced, is used as the support material. To achieve a good bonding of the two materials, they are injected one shortly after the other into a mold, i.e. one of the materials is injected while the first injected material is still in the pasty state.

The support(s) 15, 25 of the base bodies 10, 20 can also be embodied as prefabricated non-magnetizable insertion elements, on which the magnetic elements 11, 12, 21, 22 are injection-molded. Here, the supports 15, 25 created in a first injection process can be used as insertion elements for the second injection process.

In summary, each base body 10, 20 is made in the same manner. For example, in the case of base body 10, the non-magnetized support 15 is first formed by an injection molding a non-magnetized material into a mold. After the support 15 is formed, the magnetic elements 11, 12 are simultaneously formed on the support 15 by injecting a magnetic material into the mold that contains the support 15 so that the base body of FIG. 2 is formed. The process can be reversed where the magnetic elements 11, 12 are simultaneously formed via first injecting the magnetic material into the mold so that the magnetic elements 11, 12 are formed. Next the non-magnetized support 15 is formed on the magnetic elements 11, 12 by injecting the non-magnetizable material into the mold that contains the magnetic elements 11, 12. The end result of either process is that the support 15 is injection molded to the magnetic elements 11, 12 and the support 15 and magnetic elements 11, 12 are spatially next to each other as shown in FIG. 2.

If the scale 1 is intended to be used under high temperatures and is required to have a particularly great strength, a castable magnetic material AlNiCo or iron-chromium-cobalt (such as the material manufactured under the trademark Crovac by Vacuumschmelze GmbH & Co., KG of Hanau, Germany) is employed as the magnetic material. In that case the non-magnetic support 15, 25 preferably consists of a castable non-magnetizable metal.

The area of use of the scales 1 embodied in accordance with the present invention is with incremental or absolute angle or linear measuring systems. Here, the magnetic elements 11, 12, 21, 22 can be arranged in only one track, but advantageously in several tracks.

Figure 3:
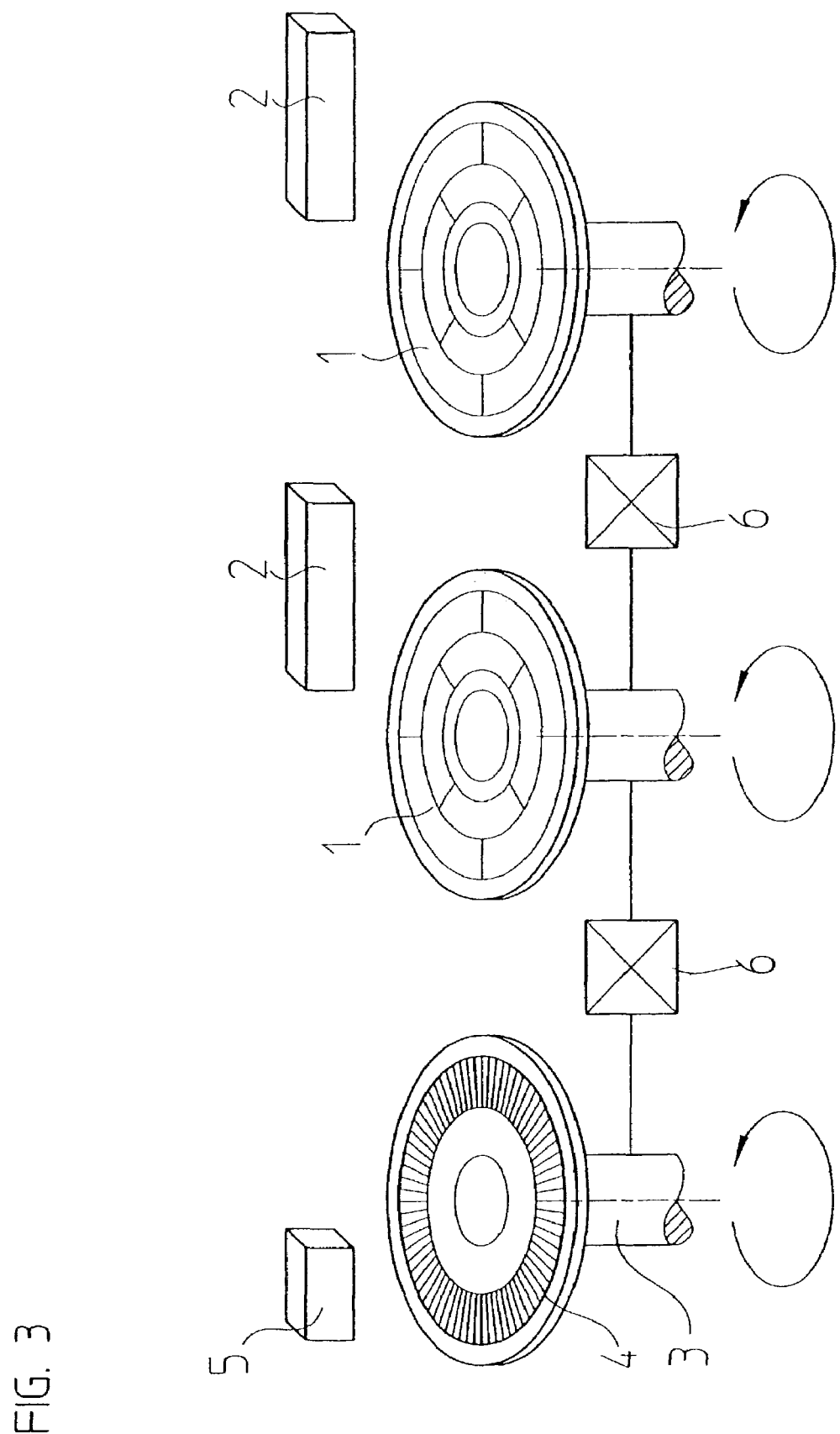
FIG. 3 represents an embodiment of a position measuring system with a plurality of the scales of FIG. 1 in accordance with the present invention.

A particularly advantageous employment of the coded disk 1 in accordance with the present invention is represented in FIG. 3 by a multi-turn angle encoder. In such an angle measuring system, a coded disk 4 is fastened on an input shaft 3 for measuring the position within one revolution of the input shaft 3. This coded disk 4 is scanned by a scanning device 5. For picking up the number of revolutions, several identical coded disks 1 embodied in accordance with the present invention are driven by the input shaft 3 via reduction gears 6.

Further exemplary embodiments exist within the scope of the present invention besides the described examples.

We claim:

1. A scale, comprising:
   a first base body, when considered in isolation, having a structure comprising:
      a first set of non-magnetizable supports; and
      a first set of magnetic elements that are arranged laterally next to one of said first set of non-magnetizable supports, are magnetized in a single identical direction and are arranged in a measuring direction wherein said first set of magnetic elements are arranged within a first set of tracks, wherein each of said first set of tracks are bounded only by two parallel walls of adjacent ones of said first set of non-magnetizable supports, and wherein said first set of tracks, viewed vertically with respect to said measuring direction, are arranged spaced apart from each other by a space;
   a second base body, when considered in isolation from the first base body, has a structure comprising:
      a second non-magnetizable support; and
      a second set of magnetic elements that are arranged laterally next to said second non-magnetizable support, are magnetized in said single identical direction and are arranged in said measuring direction;
   wherein said first base body and said second base body are put together such that:
      in said measuring direction alternating ones of said first and second sets of magnetic elements are arranged and said first and second sets of magnetic elements have different magnetic orientations with respect to each other, wherein said one of said first set of non-magnetizable supports and said second non-magnetizable support are arranged in at least said space; and wherein said first set of tracks are concentric with one another and said one of said first set of magnetizable supports and said second non-magnetizable support are arranged in the form of concentric rings between two of said first set of tracks.

2. The scale in accordance with claim 1, wherein said first base body comprises a first set of spaces defined between said first set of magnetic elements and said second set of magnetic elements are inserted into each one of said first set of spaces.

3. The scale in accordance with claim 1, wherein said first and second base bodies each have an identical geometry and magnetization.

4. The scale in accordance with claim 1, wherein said first and second sets of magnetic elements are magnetized along an axis of symmetry of said scale.

5. The scale in accordance with claim 1, wherein each of said first set of magnetic elements comprises a plastic-bonded hard magnetic material.

6. The scale in accordance with claim 5, wherein said hard magnetic material is defined by the group consisting of neodymium- iron-boron, samarium-cobalt or a ceramic magnetic material.

7. The scale in accordance with claim 1, wherein said one of said first set of non-magnetizable supports is made of polyamide.

8. The scale in accordance with claim 1, wherein said one of said first set of non-magnetizable supports is made of a castable, non-magnetizable material, and said first set of magnetic elements comprise a castable magnetic material.

9. The scale in accordance with claim 1, wherein said first set of magnetic elements are attached to said one of said first set of non-magnetizable supports.

10. The scale in accordance with claim 9, wherein said second set of magnetic elements are attached to said second non-magnetizable support.

11. The scale in accordance with claim 9, wherein said first set of magnetic elements are injection molded to said one of said first set of non-magnetizable supports.

12. The scale in accordance with claim 11, wherein said second set of magnetic elements are attached to said second non-magnetizable support.

13. The scale in accordance with claim 12, wherein said second set of magnetic elements are injection molded on said second non-magnetizable support.

14. A method for producing a scale, comprising:
   providing a first base body, when considered in isolation, having a structure comprising:
      a first set of non-magnetizable supports; and
      a first set of magnetic elements that are arranged laterally next to one of said first set of non-magnetizable supports, are magnetized in a single identical direction and are arranged in a measuring direction, wherein said first set of magnetic elements are arranged within a first set of tracks and wherein each of said first set of tracks are bounded only by two parallel walls of adjacent ones of said first set of non-magnetizable supports, and wherein said first set of tracks, viewed vertically with respect to said measuring direction, are arranged spaced apart from each other by a space;
   providing a second base body, when considered in isolation from the first base body, has a structure comprising:
      a second non-magnetizable support; and
      a second set of magnetic elements that are arranged laterally next to said second non-magnetizable support, are magnetized in said single identical direction and are arranged in said measuring direction; and
   combining said first base body with said second base body by sticking them together such that;
      in said measuring direction alternating ones of said first and second sets of magnetic elements are arranged and said first and second sets of magnetic elements have different magnetic orientations with respect to each other, and wherein said one of said first non-magnetizable supports and said second non-magnetizable support are arranged in at least said space; and wherein said first set of tracks are concentric with one another and said first and second non-magnetizable supports are arranged in the form of concentric rings between two of said first set of tracks.

15. The method in accordance with claim 14, wherein said first base body is produced by a dual injection-molding process by injecting a first material constituting said first support onto a second material that constitutes said first set of magnetic elements.

16. The method in accordance with claim 15, wherein said second base body is produced by a dual injection-molding process by injecting a third material constituting said second support onto a fourth material that constitutes said second set of magnetic elements.

17. The method in accordance with claim 14, further comprising attaching said first set of magnetic elements to said one of said first set of non-magnetizable supports.

18. The method in accordance with claim 17, wherein said attaching comprises injection molding said first set of magnetic elements to said one of said first set of non-magnetizable supports.

19. The method in accordance with claim 17, further comprising attaching said second set of magnetic elements to said second non-magnetizable support.

20. The method in accordance with claim 19, wherein said attaching comprises injection molding said second set of magnetic elements to said second non-magnetizable support.

21. A position measuring system comprising:
a scale, comprising:
  a first base body, when considered in isolation, having a structure comprising:
    a first set of non-magnetizable supports; and
    a first set of magnetic elements that are arranged laterally next to said first non-magnetizable support, are magnetized in a single identical direction and are arranged in a measuring direction, wherein said first set of magnetic elements are arranged within a first set of tracks, wherein each of said first set of tracks are bounded only by two parallel walls of adjacent ones of said first set of non-magnetizable supports, and wherein said first set of tracks, viewed vertically with respect to said measuring direction, are arranged spaced apart from each other by a space;
  a second base body, when considered in isolation from the first base body, has a structure comprising:
    a second non-magnetizable support; and
    a second set of magnetic elements that are arranged laterally next to said second non-magnetizable support, are magnetized in said single identical direction and are arranged in said measuring direction; and
  wherein said first base body and said second base body are put together such that:
    in said measuring direction alternating ones of said first and second sets of magnetic elements are arranged and said first and second sets of magnetic elements have different magnetic orientations with respect to each other; and wherein said one of said first set of non-magnetizable suports and said second non-magnetizable support are arranged in at least said space; and wherein said first set of tracks are concentric with one another and said first and second non-magnetizable supports are arranged in the form of concentric rings between two of said first set of tracks; and
a scanning element, which is sensitive to a magnetic field, for scanning said first and second sets of magnetic elements.

22. The position measuring system in accordance with claim 21, further comprising:
a second scale;
a reduction gear that drives both said scale and said second scale in a manner in which they are geared down in relation to each other;
a driveshaft coupled to said reduction gear, wherein said position measuring system is a multi-turn angle encoder for measuring an absolute position of said driveshaft over several revolutions.

23. The position measuring system in accordance with claim 21, wherein said first set of magnetic elements are attached to said one of said first set of non-magnetizable supports.

24. The position measuring system in accordance with claim 23, wherein said second set of magnetic elements are attached to said second non-magnetizable support.

25. The position measuring system in accordance with claim 23, wherein said first set of magnetic elements are injection molded to said one of said first set of non-magnetizable supports.

26. The scale in accordance with claim 25, wherein said second set of magnetic elements are attached to said second non-magnetizable support.

27. The scale in accordance with claim 26, wherein said second set of magnetic elements are injection molded on said second non-magnetizable support.

28. A scale, comprising:
a first base body, when considered in isolation, having a structure comprising:
  a first non-magnetizable support in the form of a first ring; and
  a first set of magnetic elements that are arranged only laterally next to said first non-magnetizable support, are magnetized in a single identical direction and are arranged in a measuring direction so as to define a second ring that is concentric with said first ring;
a second base body, when considered in isolation from the first base body, has a structure comprising:
  a second non-magnetizable support in the form of a third ring; and
  a second set of magnetic elements that are arranged only laterally next to said second non-magnetizable support, are magnetized in said single identical direction and are arranged in said measuring direction so as to define a fourth ring that is concentric with said first, second and third rings and offset with respect to said second ring; and
wherein said first and second sets of magnetic elements have different magnetic orientations with respect to each other.

29. The scale in accordance with claim 28, wherein said first and second sets of magnetic elements are magnetized along an axis of symmetry of said scale.

30. The scale in accordance with claim 28, wherein said first set of magnetic elements are arranged within a first set of tracks, wherein said first set of magnetic elements are arranged within a first set of tracks, wherein said first set of tracks, viewed vertically with respect to said measuring direction, are arranged spaced apart from each other by a space, and wherein said first non-magnetizable support and said second non-magnetizable support are arranged in at least said space.

31. A method for producing a scale, comprising:
providing a first base body, when considered in isolation, having a structure comprising:
  a first non-magnetizable support in the form of a first ring; and
  a first set of magnetic elements that are arranged only laterally next to said first non-magnetizable support, are magnetized in a single identical direction and are arranged in a measuring direction so as to define a second ring that is concentric with said first ring;
providing a second base body, when considered in isolation from the first base body, has a structure comprising:

a second non-magnetizable support in the form of a third ring; and a second set of magnetic elements that are arranged only laterally next to said second non-magnetizable support, are magnetized in said single identical direction and are arranged in said measuring direction so as to define a fourth ring that is concentric with said first, second and third rings and offset with respect to said second ring; and combining said first base body with said second base body by sticking them together, wherein said first and second sets of magnetic elements have different magnetic orientations with respect to each other.

32. A position measuring system comprising:

a scale, comprising:

a first base body, when considered in isolation, having a structure comprising:

a first non-magnetizable support in the form of a first ring; and a first set of magnetic elements that are arranged only laterally next to said first non-magnetizable support, are magnetized in a single identical direction and are arranged in a measuring direction so as to define a second ring that is concentric with said first ring;

a second base body, when considered in isolation from the first base body, has a structure comprising:

a second non-magnetizable support in the form of a third ring; and a second set of magnetic elements that are arranged only laterally next to said second non-magnetizable support, are magnetized in said single identical direction and are arranged in said measuring direction so as to define a fourth ring that is concentric with said first, second and third rings and offset with respect to said second ring; and wherein said first base body and said second base body are put together and said first and second sets of magnetic elements have different magnetic orientations with respect to each other; and a scanning element, which is sensitive to a magnetic field, for scanning said first and second sets of magnetic elements.

33. The position measuring system in accordance with claim 32, further comprising:

a second scale;

a reduction gear that drives both said scale and said second scale in a manner in which they are geared down in relation to each other;

a driveshaft coupled to said reduction gear, wherein said position measuring system is a multi-turn angle encoder for measuring an absolute position of said driveshaft over several revolutions.

34. The position measuring system in accordance with claim 32, wherein said first set of magnetic elements are attached to said first non-magnetizable support.

35. The position measuring system in accordance with claim 34, wherein said first set of magnetic elements are injection molded to said first non-magnetizable support.

36. The position measuring system in accordance with claim 34, wherein said second set of magnetic elements are attached to said second non-magnetizable support.

37. The position measuring system in accordance with claim 35, wherein said second set of magnetic elements are attached to said second non-magnetizable support.

38. The position measuring system in accordance with claim 36, wherein said second set of magnetic elements are injection molded on said second non-magnetizable support.

* * * * *

UNITED STATES PATENT AND TRADEMARK OFFICE
CERTIFICATE OF CORRECTION

| | | |
|---|---|---|
| PATENT NO. | : 7,253,612 B2 | Page 1 of 1 |
| APPLICATION NO. | : 10/622024 | |
| DATED | : August 7, 2007 | |
| INVENTOR(S) | : Andreas Schroter et al. | |

It is certified that error appears in the above-identified patent and that said Letters Patent is hereby corrected as shown below:

<u>In the Claims</u>

Column 6, in claim 14, line 45, immediately after "together such that" delete ";" (semicolon) and substitute --:-- (colon) in its place.

Column 6, in claim 14, line 50, after "wherein said one of said first" insert --set of--.

Signed and Sealed this

Twenty-seventh Day of November, 2007

JON W. DUDAS
*Director of the United States Patent and Trademark Office*